United States Patent [19]

Kawasaki

[11] 4,045,739
[45] Aug. 30, 1977

[54] COMBINED TRANSCEIVER AND RADIO UNIT

[75] Inventor: Kazuo Kawasaki, Kitakata, Japan

[73] Assignee: Nissan Denshi Kabushikigaisha, Omiya, Japan

[21] Appl. No.: 694,602

[22] Filed: June 10, 1976

[51] Int. Cl.² .................................. F16H 35/18
[52] U.S. Cl. ............................ 325/15; 325/25; 334/2; 74/10.45
[58] Field of Search ............ 334/1, 2; 74/10.27, 74/10.45, 10.8; 325/15, 16, 18, 21, 22, 25, 301, 352, 452

[56] References Cited

U.S. PATENT DOCUMENTS

| | | | |
|---|---|---|---|
| 3,447,008 | 5/1969 | Guyton et al. | 325/21 X |
| 3,665,310 | 5/1972 | Tweed, Jr. | 325/21 |
| 3,947,766 | 3/1976 | Kawasaki | 325/25 |

*Primary Examiner*—Benedict V. Safourek
*Attorney, Agent, or Firm*—McGlew and Tuttle

[57] ABSTRACT

The unit incorporates a transceiver, having a channel changing mechanism, and a radio, having a tuner, a tone control and a balance control, together with a volume control in a common housing having a front wall, for conjoint mounting of the unit in an automobile or the like. The front wall is formed with an opening therethrough adjacent one end thereof and with a slot therethrough adjacent the opposite end thereof. Coaxial shafts for the radio tuner, tone control and balance controls extend through the opening adjacent one end of the front wall, and have respective operating knobs secured to their outer ends whereby the radio controls are grouped adjacent the one end of the front wall. A volume control shaft is connected to the volume control, and a channel control shaft is connected to the channel changing mechanism. A tubular outer shaft extends through the slot and is connected by gears to the channel control shaft. An inner shaft extends coaxially through the tubular outer shaft and is connected, by a double universal joint, to the volume control shaft. Respective operating knobs are secured to the outer ends of the coaxial tubular and inner shafts, whereby the transceiver channel control and the volume control are conveniently grouped adjacent such opposite ends of the front wall. The coaxial tubular and inner shafts are adjustable, as a unit, along the slot to adapt to different mounting conditions, and the gears provide play for this adjustment.

3 Claims, 6 Drawing Figures

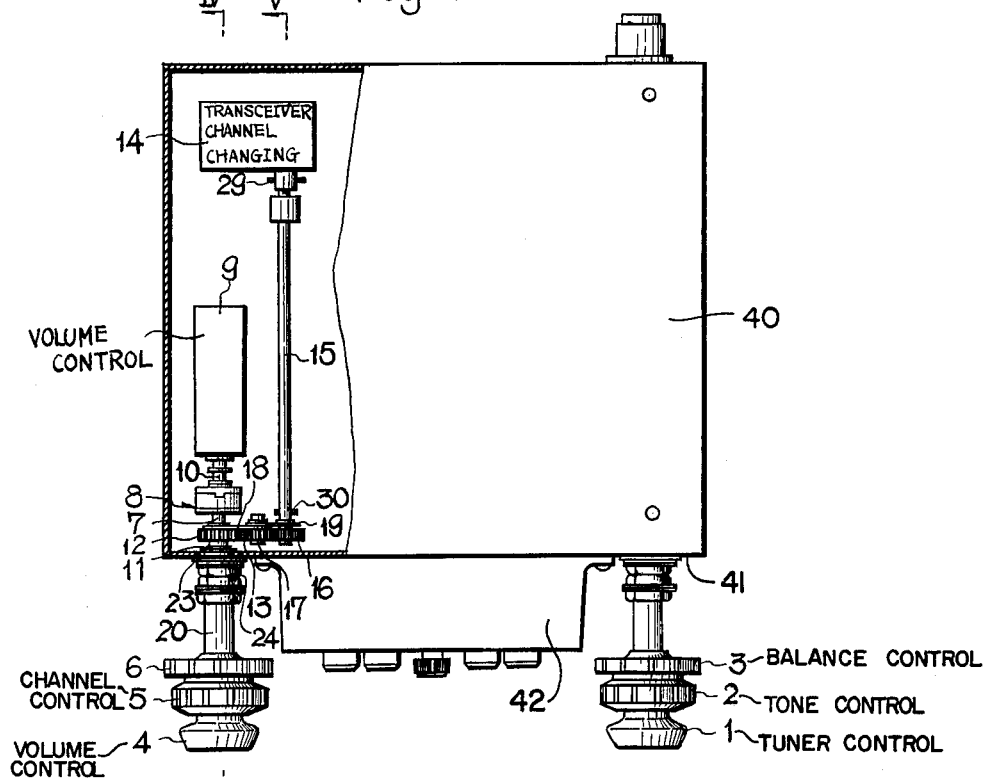
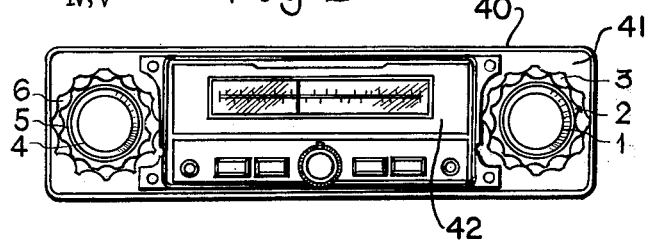
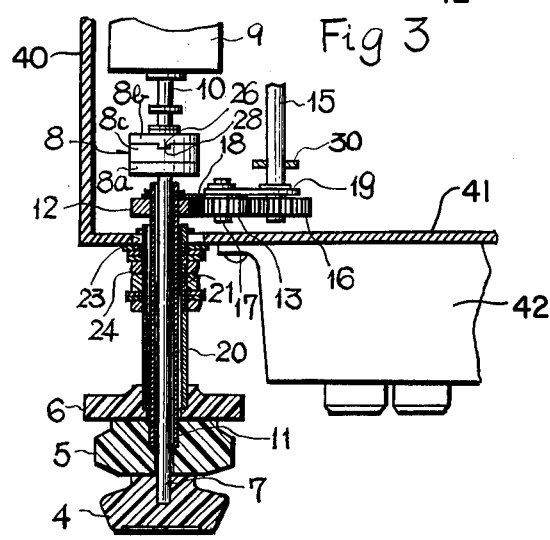

COMBINED TRANSCEIVER AND RADIO UNIT

CROSS REFERENCE TO RELATED APPLICATION

This invention relates to an improvement in the unit disclosed in prior application Ser. No. 533,004 filed, on Dec. 16, 1974 and now U.S. Pat. No. 3,947,766, issued Mar. 30, 1976 and entitled "Combined Transceiver and Radio Unit".

FIELD AND BACKGROUND OF THE INVENTION

The combined transceiver and radio unit shown in U.S. Pat. No. 3,947,766, in which the transceiver and the radio are combined in a single housing, forms a convenient and compact device for use in an automotive vehicle, such as a car or a truck. In this known unit, coaxial transceiver and radio tuner controls are mounted at one end of the front wall of the common housing for the transceiver and radio unit, and coaxial volume, tone and balance controls are mounted at the other end of such front wall. Within the housing, first and second gears, meshing with an intermediate idler gear, are provided, with the first and second gears being rotatably mounted on the opposite ends of a pair of levers pivotally interconnected at a common pivot which forms the axis for the idler gear. The outer ends of the levers are pivoted on a shaft transmitting rotation of the transceiver control to a transceiver channel changing mechanism and a shaft connected to the radio tuner control. The first and second gears are fixedly secured to these two shafts, and a double universal joint connects the radio tuner control and a radio tuner. The arrangement of the first and second gears, in association with the idler gears, provides for lateral adjustment of the coaxial transceiver and radio tuner controls to adapt to various mounting circumstances.

While the unit shown in U.S. Patent No. 3,947,766 has found ready acceptance in the field, it has a disadvantage in that there is an operational inconvenience since the transceiver channel control and the volume control are separated rather widely from each other, and the radio tuner control is separated from the tone and balance controls, also by a substantial distance. This leads to inadvertent operational mistakes.

SUMMARY OF THE INVENTION

The object of this invention is to provide an improved, more convenient transceiver and radio unit without the above disadvantage and inconveniencies. This invention is characterized in that coaxial volume control and transceiver channel changing shaft are mounted at one end of the front wall of a common housing of a combined transceiver and radio unit for car use and coaxial radio tuner-, tone-and balance-control shafts at the other end of the front wall. Thereby, the volume control and the transceiver channel changing control are conveniently grouped at one end of the front wall, and the coaxial radio tuner control, tone control and balance control are conveniently mounted at the opposite end of the front wall.

Another object of the invention is to provide a transceiver and radio unit which is simple in design, rugged in construction, and economical to manufacture.

A further object is to provide a transceiver and radio unit in which the various controls are arranged in two groups in such a manner that inadvertent wrong operation is most unlikely.

For an understanding of the principles of the invention, reference is made to the following description of a typical embodiment thereof as illustrated in the accompanying drawings.

BRIEF DESCRIPTION OF THE DRAWINGS

In the accompanying drawings,

FIG. 1 is a plan view, partly in section, of a combined transceiver and radio unit for a motor vehicle, such as a car or truck, and embodying the present invention;

FIG. 2 is a front view of the unit;

FIG. 3 is an enlarged transverse sectional view of the transceiver channel changing controls in accordance with the invention;

DETAILED DESCRIPTION OF THE PREFERRED EMBODIMENT

Figure 4:
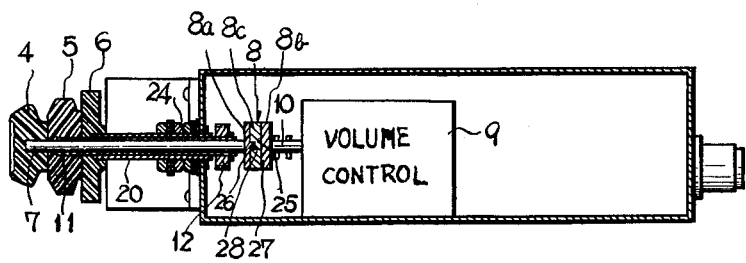
FIG. 4 is a sectional view taken along a line IV—IV in FIG. 1.
Figure 5:
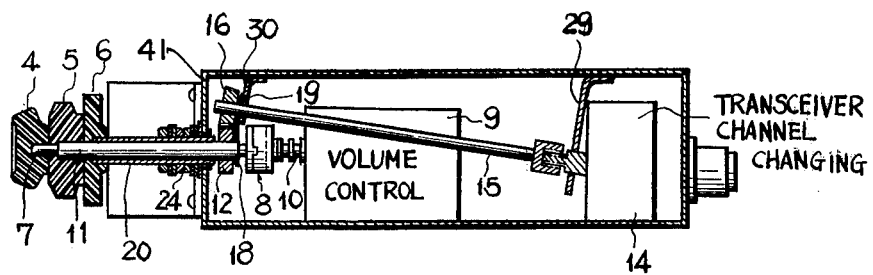
FIG. 5 is a sectional view taken along a line V—V in FIG. 1.

With reference to the drawings, in particular to FIG. 1, there is illustrated an example of a combined transceiver and radio unit embodying the invention, and designed for mounting in a motor vehicle, such as a car or truck. The transceiver and the radio form a unit by being mounted within a common housing 40 having a front wall 41. Adjacent its right end, as viewed in FIG. 2, front wall 41 is formed with an opening having extending therethrough coaxially arranged shafts having fixed, on their outer ends, respective control knobs 1, 2 and 3, with knob 1 being a radio tuner control, knob 2 being a tone control, and knob 3 being a balance control. The radio controls are thus conveniently grouped adjacent the right end of wall 41.

Adjacent its left end, as viewed in FIGS. 2 and 3, wall 41 is formed with an elongated slot 23 receiving coaxial shafts having mounted, on their outer ends, respective control knobs constituted by a volume control knob 4 and a transceiver control knob 5. In addition, an imitation knob 6 is provided, solely for esthetic reasons, and does not constitute an essential feature of the invention. The volume and transceiver controls are thus conveniently grouped adjacent the left end of wall 41 and in considerably spaced relation to the knobs 1, 2 and 3. Between the two sets of knobs, there may be arranged the usual tuning scale, operating push buttons, and the like, in an extension 42, but which form no part of the present invention.

Volume control knob 4 is mounted on the outer end of an inner shaft 7 extending through the slot 23, and its inner end is connected to an input member 8a of a double universal joint generally designated 8. Universal joint 8 includes substantially identical input and output members 8a and 8b, each having a rib 26 extending diametrically thereof, and further includes an intermediate member 8c formed, on its opposite surfaces, with grooves 28 extending at right angles to each other and each receiving a respective rib 26. The output member 8b on double universal joint 8 is connected at its inner end to a volume control mechanism 9 through a volume control shaft 10.

The transceiver channel selector control knob 5 is mounted on the outer end of a tubular outer shaft 11 through which onner shaft 7 extends coaxially. The inner end of tubular outer shaft 11 has secured thereto a gear 12. The gear 12 meshes with an idler gear 13 which meshes with a second gear 16 which is non-rotatably mounted on the outer end of a rod or shaft 15 of a transceiver channel changing mechanism 14. The rod or shafts 15 is journaled by brackets 29 and 30. The gears 12, 13 and 16 are rotatably supported on levers 18 and 19 whose inner ends are pivotally connected to a shaft 17 of the idler gear. The levers 18 and 19 are thus pivotable at their inner ends about shaft 17. The outer shaft 11 extends through a bushing 20 on whose outer end there is mounted the imitation knob 6.

As shown in FIG. 3, bushing 20 extends through the elongated slot 23 on the left hand side of the front wall 41. The inner end portion of the bushing 20 is formed with a male thread 21 which engages with a fastening nut 24. Thus, the bushing 20 can be displaced along the elongated slot 23 by loosening the fastening nut 24.

With the present invention constructed as above, when the volume control knob 4 is turned, the rotation is transmitted through the inner shaft 7, double universal joint 8 and volume control shaft 10 to the volume control mechanism 9. Likewise, when the transceiver channel changing knob 5 is turned, the rotation is transmitted through the outer shaft 11 and three gears 12, 13 and 16 to the rod 15 of the transceiver channel changing mechanism 14.

Figure 6:
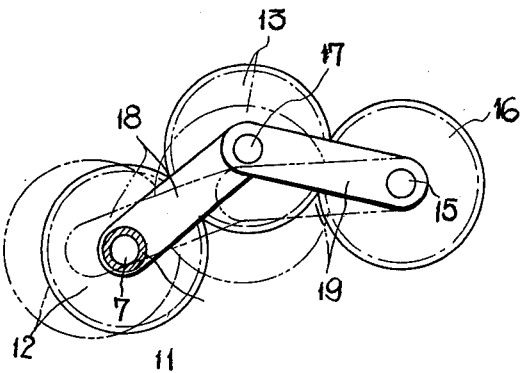
FIG. 6 is an explanatory view showing adjusting positions of three interengaging gears rotatably mounted on hinged levers.

When displacement of the left hand side controls is required depending upon the types of motor vehicle in which the unit is to be mounted, the bushing 20 is shifted along the elongated slot 23 on releasing the fastening nut 24. By employment of the double universal joint 8, the volume control knob 4 can be smoothly turned even when the inner shaft 7 and the volume control shaft 10 are not aligned. The transceiver channel changing knob 5 can also be smoothly turned since the three gears 12, 13 and 16 which are supported on the levers 18 and 19 remain engaged with each other despite the shift of the first gear 12 as shown in FIG. 6.

In accordance with the present invention, the transceiver and radio are so compactly accomodated as a unit in a common housing that the unit can be placed easily and smoothly in a radio frame of a motor vehicle, such as a car or truck. Further, employment of the coaxial dial controls which can be separately operated results in simplification of the entire unit. Moreover, mounting the radio controls separately and spaced from the volume control and transceiver channel changing shafts contributes to a simple and secure operation. The construction of the unit, where the volume control knob is connected through the universal joint to the volume control, while the coaxial transceiver channel changing knob is connected, through three interengaging gears rotatably mounted on the hinged levers, to the transceiver channel changing mechanism, has the advantage that the control shafts can be displaced, by loosening of the fastening nut, along the elongated slot on the front wall of the common housing of the unit where such displacement of the controls is required depending upon any necessity, such as car types and the like. While a specific embodiment of the invention has been shown and described and described in detail to illustrate the application of the principles of the invention, it will be understood that the invention may be embodied otherwise without departing from such principles.

1. A combined transceiver and radio unit, incorporating a transceiver, having a channel changing mechanism, a radio, having a tuner, a tone control and a balance control, and a volume control, the transceiver, radio and volume control being enclosed in a common housing, having a front wall, for conjoint mounting, said unit comprising, in combination, said front wall being elongated and formed with an opening therethrough adjacent one end thereof and a slot therethrough adjacent the opposite end thereof; respective coaxial tuner, tone control and balance control shafts extending through said opening for connection to the tuner, the tone control and the balance control, respectively; respective operating knobs secured to the outer ends of said coaxial shafts, whereby the radio controls are conveniently grouped adjacent said one end of said front wall; a volume control shaft having an inner end connected to said volume control and having an outer end; a channel control shaft having an inner end connected to said channel changing mechanism and having an outer end; a tubular outer shaft extending through said slot and having inner and outer ends; gear means connecting the inner end of said tubular shaft to the outer end of said channel control shaft; an inner shaft extending coaxially through said tubular outer shaft and having inner and outer ends; coupling means connecting the inner end of said inner shaft to the outer end of said volume control shaft; and respective operating knobs secured to the outer ends of said coaxial tubular and inner shafts, whereby the transceiver channel control and the volume control are conveniently grouped adjacent said opposite end of said front wall.

2. A combined transceiver and radio unit, as claimed in claim 1, in which said coupling means comprises a universal joint.

3. A combined transceiver and radio unit, as claimed in claim 2, in which said gear means comprises a first gear fixed to rotate with said inner shaft; a second gear fixed to rotate with said channel control shaft; a pair of links having their inner ends pivotally interconnected at a pivot and their outer ends pivotal, respectively, on said inner shaft and said channel control shaft; and a third gear freely rotatable on said pivot and meshing with said first and second gears; whereby said gear means accommodates adjustment of said coaxial tubular and inner shafts along said slot.

* * * * *